(12) United States Patent
Haring et al.

(10) Patent No.: US 8,753,433 B2
(45) Date of Patent: Jun. 17, 2014

(54) MEMBRANE TUBE AND REACTOR HAVING A MEMBRANE TUBE

(75) Inventors: Wolfgang Haring, Munich (DE); Nicole Schodel, Munich (DE); Axel Behrens, Munich (DE); Klaus Klapper, Pullach (DE); Matthias Ruttinger, Reutte (AT); Karlheinz Scheiber, Breitenwang (AT); Markus Kogl, Vils (AT); Marco Brandner, Oy-Mittelberg (DE)

(73) Assignee: Plansee SE, Reutte (AT)

( * ) Notice: Subject to any disclaimer, the term of this patent is extended or adjusted under 35 U.S.C. 154(b) by 205 days.

(21) Appl. No.: 13/263,105

(22) PCT Filed: Mar. 30, 2010

(86) PCT No.: PCT/EP2010/002035
§ 371 (c)(1),
(2), (4) Date: Nov. 28, 2011

(87) PCT Pub. No.: WO2010/115562
PCT Pub. Date: Oct. 14, 2010

(65) Prior Publication Data
US 2012/0060692 A1  Mar. 15, 2012

(30) Foreign Application Priority Data
Apr. 7, 2009  (DE) .......................... 10 2009 016 694

(51) Int. Cl.
*B01D 53/22* (2006.01)
*B01D 69/04* (2006.01)

(52) U.S. Cl.
USPC .................. 96/10; 96/4; 96/11; 95/55; 95/56; 29/428

(58) Field of Classification Search
USPC ............ 96/4, 8, 10, 11; 95/45, 55, 56; 29/428
See application file for complete search history.

(56) References Cited

U.S. PATENT DOCUMENTS 3,768,660 A    10/1973  Block
5,498,278 A *  3/1996  Edlund ............................ 96/11
(Continued)

FOREIGN PATENT DOCUMENTS

DE  199 43 409    3/2001
DE  103 22 715   12/2004
(Continued)

OTHER PUBLICATIONS

Office Action for related Chinese Patent Application No. 201080015209.5 dated May 28, 2013.
(Continued)

*Primary Examiner* — Jason M Greene
(74) *Attorney, Agent, or Firm* — Millen, White, Zelano & Branigan, P.C.

(57) ABSTRACT

The invention relates to a diaphragm pipe for permeative separation of hydrogen from gas mixtures containing hydrogen, a method for the production thereof as well as a reactor comprising a diaphragm pipe, wherein the diaphragm pipe comprises a porous pipe (S) made of a sintered metal and a diaphragm (M) containing palladium or made of palladium enclosing the outer surface of the sintered metal pipe (S). The sintered metal pipe (S) has at least on one end a fitting (F) made of gasproof material, which is firmly connected with the sintered metal pipe (S).

20 Claims, 4 Drawing Sheets

(56) References Cited

U.S. PATENT DOCUMENTS

| | | | |
|---|---|---|---|
| 7,022,165 B2 * | 4/2006 | Paglieri et al. | 96/10 |
| 7,255,729 B2 * | 8/2007 | Yamada et al. | 96/8 |
| 7,947,116 B2 | 5/2011 | Mundschau et al. | |
| 8,163,064 B2 * | 4/2012 | Bredesen et al. | 95/45 |
| 8,177,889 B2 * | 5/2012 | Ooya | 96/11 |
| 8,353,977 B2 * | 1/2013 | Noda | 95/56 |
| 2004/0244583 A1 * | 12/2004 | Ma et al. | 95/55 |
| 2007/0209513 A1 | 9/2007 | Shinkai et al. | |
| 2008/0000350 A1 * | 1/2008 | Mundschau et al. | 95/56 |

FOREIGN PATENT DOCUMENTS

| | | |
|---|---|---|
| FR | 2 858 776 | 2/2005 |
| JP | 4346824 | 12/1992 |
| JP | H05 76738 | 3/1993 |
| JP | 2960998 | 10/1999 |
| JP | 2000 296316 | 10/2000 |
| JP | 2007 269600 | 10/2007 |
| JP | 2007-269600 A | 10/2007 |
| JP | 2007269600 | 10/2007 |
| WO | 2007092844 | 8/2007 |
| WO | WO 2007/092844 A2 | 8/2007 |

OTHER PUBLICATIONS

English Translation of Office Action for related Chinese Patent Application No. 201080015209.5 dated May 28, 2013.

Mitsubishi Heavy Ind. Ltd., "Hydrogen Gas Separation Membrane," Espacenet, Publication Date: Oct. 12, 1999, English Abstract of JP-2960998.

NGK Spark Plug Co., "Hydrogen separation apparatus and hydrogen production system," Espacenet, Publication Date: Oct. 18, 2007; English Abstract of JP-2007 269600.

Mitsubishi Heavy Ind Ltd., "Hydrogen Separating Membrane," Thomson Innovation, Publication Date: Dec. 2, 1992; English Abstract of JP-4 346 824.

International Search Report of PCT/EP2010/002035 (Jul. 8, 2010).

Dittmeyer, R. et al. "Composite membrane for the dehydrogenation of propane comprises a sintered metal body provided with a corrosion resistant material and a membrane layer disposed on the body or on an intermediate layer"; Machine English translation of German Patent Publication No. DE10322715A1; Publication Date: Dec. 9, 2004; Application No. DE10322715A; Filing Date: May 20, 2003; (Thomson Innovation Record View).

Heinrich, P. "Composite used in fixed bed membrane reactor is made of membrane in form of thermally sprayed coating on sintered metallic support body"; Machine English translation of German Patent Publication No. DE 19943409A1; Publication Date: Mar. 15, 2001; Application No. DE19943409A; Filing Date: Sep. 10, 1999; (Thomson Innovation Record View).

Full English Translation of JP 2007090293A. "Hydrogen separation component has cylindrical support comprising porous sintered compact and hydrogen permeable film supported on flat portion of support having preset area ratio of flat portion". Publication Date: Apr. 12, 2007. Application No. JP 2005286022. Filing Date: Sep. 30, 2005. (Thomson Innovation Record View).

Full English Translation of JP 2007269600A. "Hydrogen isolation apparatus for hydrogen fuel cell of motor vehicle has isolator that separates wax material joining hydrogen isolation element and fixed metal element, and hydrogen.permeable film formed on separation element". Publication Date: Oct. 18, 2007. Application No. JP 206100160A. Filing Date: Mar. 31, 2006. (Thomson Innovation Record View).

Full English Translation of JP 2008246315A. "Hydrogen separator for fuel cell comprises hydrogen-permeable membrane which selectively permeates hydrogen gas, and sealing component provided in outer peripheral surface of ceramic forming body". Publication Date: Oct. 16, 2008. Application No. JP 200788670A. Filing Date: Mar. 29, 2007. (Thomason Innovation Record View).

English Abstract of JP 2007090293A. Publication Date: Apr. 12, 2077. Inventor: Ishibe Hideomi, et al. Applicant: Nippon Seisen Co. Ltd. Application No. JP 2005286022. Filing Date: Sep. 30, 2005. (Espacenet).

English Abstract of JP 2007090293A. Publication Date: Oct. 18, 2007. Inventor: Mitsuya Kohei et al. Applicant: NGK Spark Plug Co. et al. Application No. JP 206100160A. Filing Date: Mar. 31, 2006. (Espacenet).

English Abstract of JP 2008246315A Publication Date: Oct. 16, 2008. Inventor: Shigaki Hidekazu et al. Applicant: NGK Spark Plug Co. et al. Application No. JP 200788670A. Filing Date: Mar. 29, 2007.(Espacenet).

English Abstract of Japanese Publication No. 2000-296316. Publication Date: Oct. 24, 2000. JP Application No. 11-104533. Filing Date: Apr. 12, 1999. Inventor: Hamada Yukitaka et al. Applicant: Ishikawajima Harima Heavy Ind Co Ltd. et al. (Patent Abstracts of Japan).

English Abstract of Japanese Publication No: 2007-269600. Publication Date: Oct. 18, 2007. JP Application No. 2006-100160. Filing Date: Mar. 31, 2006. Inventor: Mitsuya Kohei et al. Applicant: NGK Spark Plug Co Ltd et al. (Patent Abstracts of Japan).

English Abstract of Japanese Publication No. 05-076738. Publication Date: Mar. 30, 1993. JP Application No. 03-245430. Filing Date: Sep. 25, 1991. Inventor: Ushifusa Yoshinori et al. Applicant: Mitsubishi Heavy Ind Ltd. (Patent Abstracts of Japan).

English Translation of FR 2858776. Publication Date: Feb. 18, 2005. Application No. FR20039812. Filing Date: Aug. 11, 2003. Inventor: Christophe Puyenchet. Applicant: Cie D Etudes Des Technologies. (Thomson Innovation Record View).

EP Search Report in EP Application 13 17 9017. Dated: Sep. 26, 2013. Language: Germany (European Patent Office).

Chinese Office Action dated Jan. 9, 2014 issued in corresponding 201080015209.5 application (pp. 1-8).

English Translation of the Chinese Office Action issued in corresponding 201080015209.5 application (pp. 1-8).

* cited by examiner

MEMBRANE TUBE AND REACTOR HAVING A MEMBRANE TUBE

The invention relates to a membrane tube for the permeative separation of hydrogen from hydrogen-containing gas mixtures, which comprises a porous tube made of a sintered metal and a membrane which contains palladium or consists of palladium and encloses the outside of the sintered metal tube.

Furthermore, the invention relates to a process for producing a membrane tube and also a reactor having at least one membrane tube.

Reactors for isolating hydrogen, by means of which hydrogen is separated permeatively from hydrogen-containing gas mixtures have been known for decades to those skilled in the art and are commercially available in various construction types. They utilize the fact that palladium or palladium-containing alloys (hereinafter, palladium-containing alloys such as Pd—Ag or Pd—Cu alloys are encompassed by the term palladium) are selectively permeable to hydrogen. In practice, a construction in which tubes made of palladium membranes are welded at at least one open end into a perforated plate and thereby fixed has been found to be useful. The other end of a membrane tube is, in contrast, welded shut in a gastight manner but not fixed in the reactor. The one-ended fixing of the membrane tubes is necessary because the membranes expand during reactor operation as a result of heating and the uptake of hydrogen, which would in the case of two-ended fixing lead to occurrence of stresses and deformations and also to rapid crack formation which would make the membranes porous.

To stabilize a palladium membrane, the first publication DE 103 33 715, for example, describes the use of a sintered metal body which functions as support and onto which the palladium membrane is applied, with the support taking up most of the forces occurring during use. To prevent metals from diffusing from the sintered metal body into the palladium membrane and impairing the hydrogen permeability of the latter, a thin ceramic layer is applied as diffusion barrier between the outside of the sintered metal body and the palladium membrane. Membrane tubes built up according to this principle are known from the first publication DE 199 43 409; these are welded into reactors by means of conventional welding processes, e.g. the WIG process. It has been found in practice that, due to the very different properties of sintered metal tubes and the perforated plates consisting of solid metallic material, it is very difficult to make the welds durably gastight. Even after short periods of operation, cracks via which the retentate gets into the hydrogen separated off (permeate) and contaminates the latter occur.

It is therefore an object of the present invention to provide a membrane tube of the type in question and also a process for producing such a membrane tube, by means of which the disadvantages of the prior art can be overcome.

The stated object in respect of the membrane tube is achieved according to the invention by at least one end, preferably both ends, of the sintered metal tube having a fitting which consists of a gastight material and is fixed to the sintered metal tube.

For the purposes of the present patent application, a fitting is a part via which a membrane tube can be joined to another tube and a plant component or via which a membrane tube can be closed off in a gastight manner. Examples of fittings are flanges, muffs, sleeves and reducing sections, but also, for example, perforated plates via which the plurality of membrane tubes can be fastened in a reactor.

A fitting preferably consists of metal or ceramic or a composite comprising metal and ceramic.

The fitting allows a membrane tube according to the invention to be durably joined in a gastight manner to another component, e.g. a perforated plate or a tube in a reactor, by means of conventional joining techniques such as welding, soldering, adhesive bonding or screwing.

Advantageous embodiments of the invention provide that the palladium membrane projects beyond the sintered metal tube at its end at which the fitting is located and is joined in a gastight manner to the fitting.

As is known from the prior art, the compositions of the parts play only a minor role in the joining of two metal parts by sintering or soldering. Regardless of whether the two parts have identical, similar or completely different compositions, they can be durably fixed to one another. The invention therefore provides that the fitting consists of a material which has the identical composition, a similar composition or a completely different composition as/from the material of which the sintered metal tube consists. A prerequisite is, however, that the fitting consists of an appropriately high-temperature-stable material in order to survive the sintering process, which is typically carried out at temperatures in the range from 1000 to 1600° C., or the soldering process, which is typically carried out at temperatures in the range from 450 to 1300° C., without damage.

Friction welding is a technology which has been known to those skilled in the art for many years (Handbuch der Schweißtechnik, Part II, Böhme, Herrmann). It is suitable for durably joining metallic components to one another in an economical way, particularly when the components consist of different materials and have rotational symmetry. In frictional welding, large-area melting of the parts to be welded together is avoided. As a result, the risk of damage due to thermal stresses is reduced, since the heat influence zone is substantially smaller than in other welding processes and heating is limited to a very local region. A pore- and defect-free join is achieved by friction welding. Any bead formed can be removed after welding.

To avoid tensile or compressive stresses between sintered metal tube and fitting, which could occur on heating of a membrane tube because of different coefficients of thermal expansion, the fittings preferably consist of the same material as the sintered metal tube and the plant component to which they are to be joined.

To prevent metals from diffusing from the sintered metal tube into the palladium membrane and impairing the hydrogen permeability of the latter, a further advantageous embodiment of the invention provides that the membrane tube has a ceramic layer which consists, for example, of zirconium oxide partially stabilized with yttrium or pure zirconium oxide or titanium oxide or aluminum oxide and acts as diffusion barrier and is arranged between sintered metal tube and palladium membrane.

The connecting area between fitting and sintered metal tube can be selected freely within wide limits. However, preferred embodiments of the membrane tube of the invention provide that the connecting area between fitting and sintered metal tube is arranged symmetrically relative to the axis of the membrane tube and has the shape of a circular ring or a cone surface, with the surface of the cone opening either in the direction of the fitting or of the sintered metal tube. To increase the strength of the join between fitting and sintered metal tube, a further embodiment of the invention provides that the connecting area between the two parts is roughened or provided with flutes or grooves.

The invention further relates to a process for producing a membrane tube for the permeative separation of hydrogen from hydrogen-containing gas mixtures, which comprises the steps:

a: joining a fitting consisting of a gastight material to an open end of a gas-permeable sintered metal tube;
b: application of a membrane containing palladium or consisting of palladium so as to completely cover the sintered metal tube.

The palladium membrane is advantageously applied in such a way that it at least partly covers the fitting and is joined to the latter in a gastight manner.

Preferred embodiments of the process of the invention provide that the fitting is joined to the sintered metal tube by sintering or soldering or friction welding.

To join fitting and sintered metal tube to one another, it is possible, according to the invention, to employ various soldering processes, with the preferred processes being soft soldering or hard soldering or high-temperature soldering processes. The solder used in this case is different from the materials of the parts to be joined and is selected from the group consisting of the elements Cu, Zn, Ni, Al, Sn, Fe, Pd, Au, Ag, Co, Cr, Si, B, Mo, W, Ti, P, C, In, Ge, V, Pb, Cd and alloys thereof.

Since the sintered metal tube can have deviations in the roundness both of the external diameter and the internal diameter as a result of the sintering process, an embodiment of the process of the invention provides that the sintered metal tube is rolled or hammered directly into or onto the fitting before joining. On the other hand, another embodiment of the process of the invention provides that the sintered metal tube is brought to defined dimensions by rolling, turning or hammering in a process step preceding joining. In this way, it is possible, for example, to obtain a defined and uniform soldering gap between fitting and sintered metal tube. The rolling or hammering reduces the porosity of the sintered metal tube in the transition region to the fitting, as a result of which the strength of the join is increased. In addition, in the case of a soldered join, the infiltration of solder is reduced, which leads to an improvement in the quality of the soldering seam.

An increase in the strength is also achieved by the connecting areas between fitting and sintered metal tube being roughened or provided with grooves or flutes before joining.

When the membrane tube is to have a ceramic layer which acts as diffusion barrier and is arranged between sintered metal tube and palladium membrane, an advantageous embodiment of the process of the invention provides that at least the outside of the sintered metal tube is coated with the diffusion barrier before the palladium membrane is applied in such a way that it completely covers the diffusion barrier. The diffusion barrier is preferably made of zirconium oxide partially stabilized with yttrium or pure zirconium oxide or titanium oxide or aluminum oxide.

The membrane tube of the invention makes it possible to realize reactors for the production of hydrogen which can be operated significantly more economically than reactors available at present according to the prior art since they are more durable and allow a hydrogen product having a higher purity to be obtained. The invention therefore proposes a reactor for producing hydrogen, which has at least one membrane tube according to the invention which is fixed at one end via a fitting in the reactor and is joined to the latter in a gastight manner, for example by means of a welded seam.

In the following, the shape of the connecting area between a fitting and a sintered metal tube will be illustrated with the aid of the examples schematically shown in FIGS. 1 to 7. The figures in each case show the open end of a membrane tube according to the invention in longitudinal section, with fitting and sintered metal tubes being joined to one another by sintering, soldering or friction welding. The end of the sintered metal tube can be adapted to the shape of the fitting in a rolling step preceding the sintering, soldering or friction welding.

Figure 1:
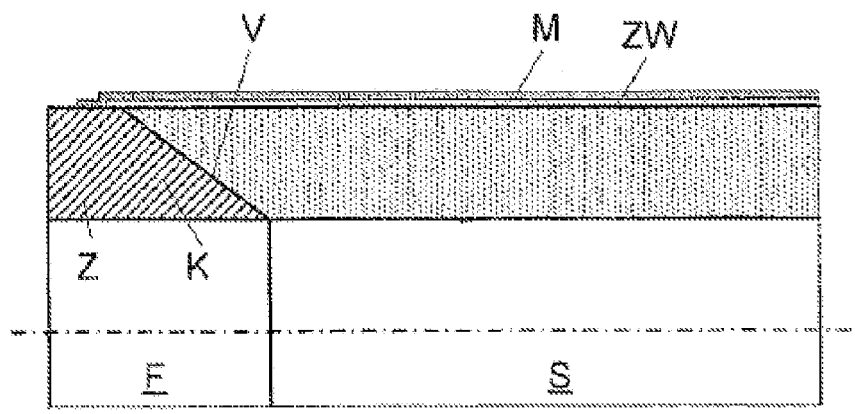
FIG. 1 illustrates a membrane tube with a fitting in accordance with the invention wherein the fitting has a shape made up of a hollow cylinder and a cone.

The membrane tube shown in FIG. 1 is equipped with a fitting F whose shape is made up of a hollow cylinder Z and a cone K, with fitting F and sintered metal tube S having the same external and internal diameter. Fitting F and sintered metal tube S are joined to one another via the smooth connecting area V which has the shape of a cone surface opening in the direction of the fitting F. A ceramic intermediate layer ZW has been applied as diffusion barrier on the outside of the sintered metal tube S and extends into the cylindrical part Z of the fitting F. A palladium membrane M has been applied over the intermediate layer ZW and projects beyond the intermediate layer ZW and is joined in a gastight manner to the fitting F.

Figure 2:
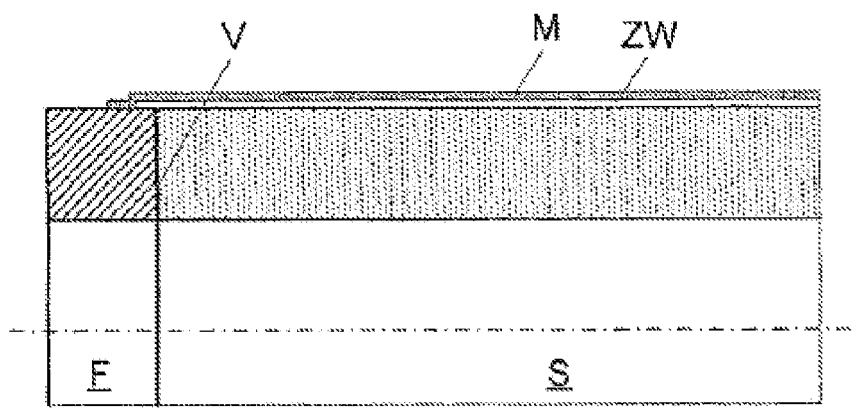
FIG. 2 illustrates a membrane tube with a fitting in accordance with the invention wherein the fitting has a shape made up of a hollow cylinder.

FIG. 2 shows a membrane tube having a fitting F which has the shape of a hollow cylinder which has the same external and internal diameter as the sintered metal tube S. Fitting F and sintered metal tube S are joined to one another via the circular ring area V. A ceramic intermediate layer ZW has been applied to the outside of the sintered metal tube S and also covers part of the fitting F. A palladium membrane M has been applied over the intermediate layer ZW and projects beyond the intermediate layer ZW and is joined in a gastight manner to the fitting F.

Figure 3:
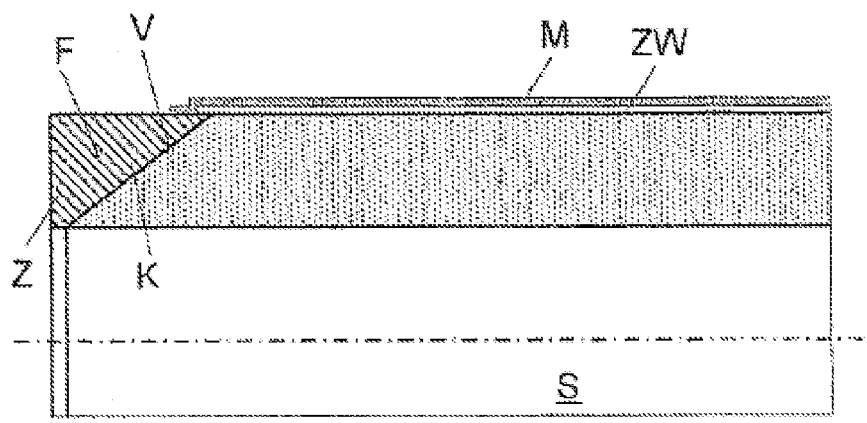
FIG. 3 illustrates another embodiment of a membrane tube with a fitting in accordance with the invention wherein the fitting has a shape made up of a hollow cylinder and a cone.

The membrane tube shown in FIG. 3 is equipped with a fitting F whose shape is made up of a hollow cylinder Z and a cone K, with fitting F and sintered metal tube S having the same external and internal diameter. Fitting F and sintered metal tube S are joined to one another via the smooth connecting area V which has the shape of a cone surface opening in the direction of the sintered metal tube S. A ceramic intermediate layer ZW has been applied to the outside of the sintered metal tube S and extends into the cylindrical part Z of the fitting F. A palladium membrane M has been applied over the intermediate layer ZW and projects beyond the intermediate layer ZW and is joined in a gastight manner to the fitting F.

Figure 4:
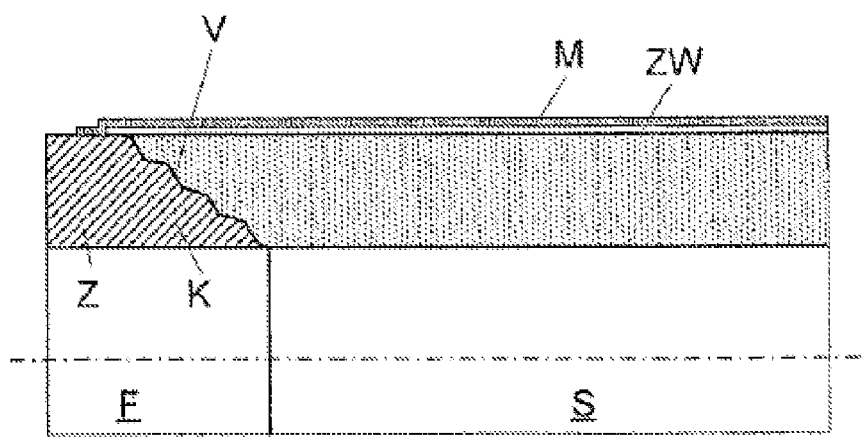
FIG. 4 illustrates an embodiment of a membrane tube with a fitting in accordance with the invention wherein the fitting has the shape made up of a hollow cylinder and an essentially conical shape.

FIG. 4 shows a membrane tube having a fitting F whose shape is made up of a hollow cylinder Z and a section K which has an essentially conical shape, with fitting F and sintered metal tube S having the same external and internal diameter. Fitting F and sintered metal tube S are joined to one another via the connecting area V having flutes or grooves. A ceramic intermediate layer ZW has been applied to the outside of the sintered metal tube S and extends into the cylindrical part Z of the fitting F. A palladium membrane M has been applied over the intermediate layer ZW and extends beyond the intermediate layer ZW and is joined in a gastight manner to the fitting F.

Figure 5:
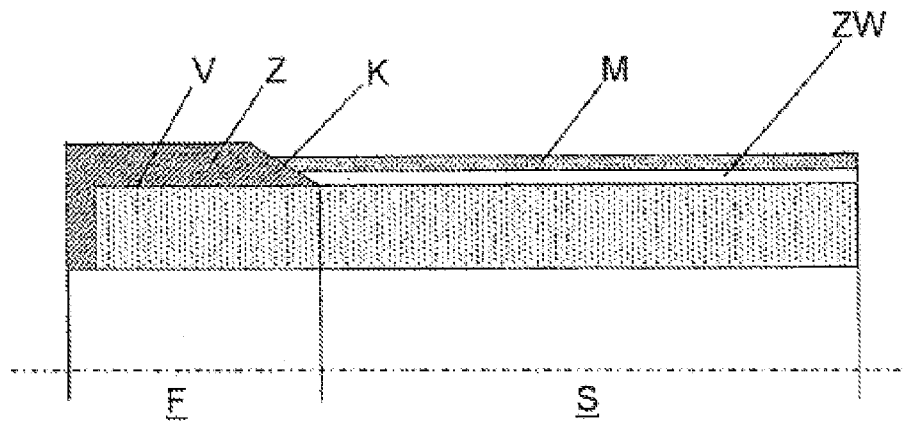
FIG. 5 illustrates another embodiment of a membrane tube with a fitting in accordance with the invention wherein the fitting has the shape made up of a hollow cylinder and an essentially conical shape.

FIG. 5 shows a membrane tube having a fitting F whose shape is made up of a hollow cylinder Z and a section K which has an essentially conical shape, with the internal diameter of the fitting F being the same as the external diameter of the sintered metal tube S. Fitting F and sintered metal tube S are joined to one another via the connecting area V. A ceramic intermediate layer ZW has been applied to the outside of the sintered metal tube and ends at the conical part of the fitting or projects into the cylindrical part Z of the fitting. A palladium membrane M has been applied over the intermediate layer ZW and extends beyond the intermediate layer ZW and is joined in a gastight manner to the fitting F.

Figure 6:
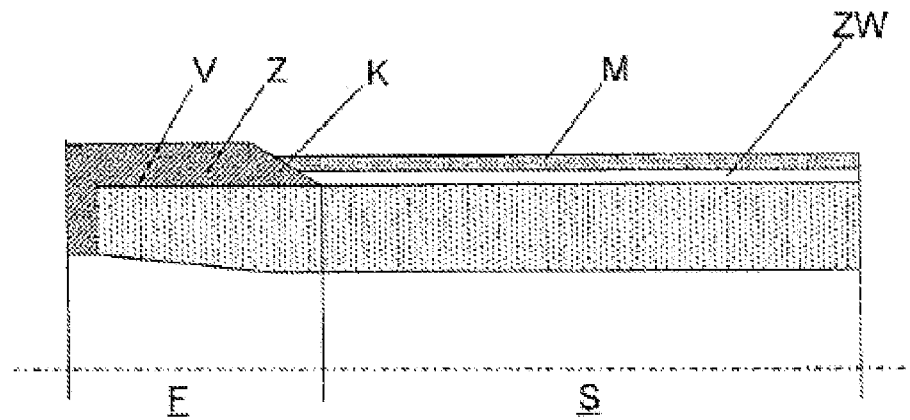
FIG. 6 illustrates another embodiment of a membrane tube with a fitting in accordance with the invention wherein the fitting has the shape made up of a hollow cylinder and an essentially conical shape.

FIG. 6 shows a membrane tube having a fitting F whose shape is made up of a hollow cylinder Z and a section K which has an essentially conical shape, with the internal diameter of the fitting F being the same as the external diameter of the sintered metal tube S. Fitting F and sintered metal tube S are joined via the connecting area V. The end of the sintered metal tube S is compacted by rolling and opens out conically. A ceramic intermediate layer ZW has been applied to the outside of the sintered metal tube and ends on the conical part of the fitting or extends onto the cylindrical part Z of the fitting. A palladium membrane M has been applied over the intermediate layer ZW and extends beyond the intermediate layer ZW and is joined in a gastight manner to the fitting F.

Figure 7:
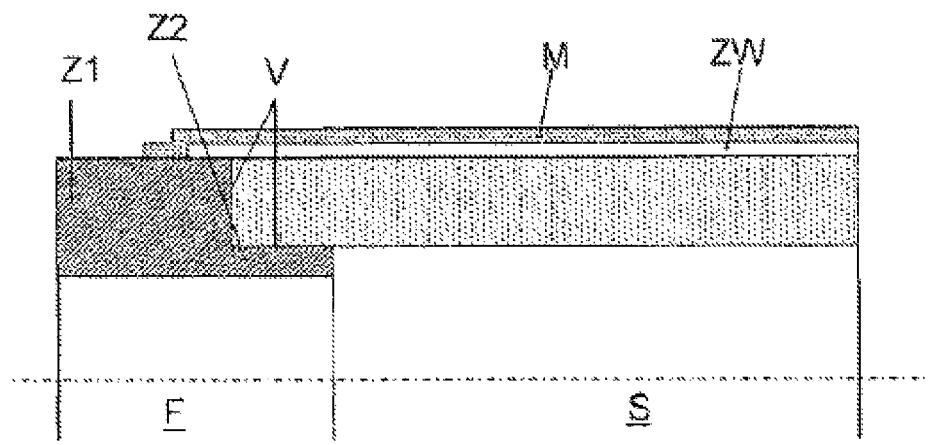
FIG. 7 illustrates another embodiment of a membrane tube with a fitting in accordance with the invention wherein the fitting has the shape made up of two hollow cylinders.

FIG. 7 shows a membrane tube having a fitting F whose shape is made up of two hollow cylinders Z1 and Z2, with the external diameter of Z1 being identical to the external diameter of the sintered metal tube S and the external diameter of Z2 being identical to the internal diameter of the sintered metal tube S. Fitting F and sintered metal tube S are joined via the connecting area V. A ceramic intermediate layer ZW has been applied to the outside of the sintered metal tube and extends onto the cylindrical part Z1 of the fitting F. A palladium membrane M has been applied over the intermediate layer ZW and extends beyond the intermediate layer ZW and is joined in a gastight manner to the fitting F.

The invention claimed is:

1. A membrane tube for the permeative separation of hydrogen from hydrogen-containing gas mixtures, said membrane tube comprising:
   a porous tube made of a sintered metal and a membrane which contains palladium and encloses the outside of the sintered metal tube,
   wherein said sintered metal tube has, at at least one end, a fitting which consists of a gastight material,
   said membrane projects beyond said sintered metal tube at said at least one end and said membrane is joined in a gastight manner to said fitting, and
   said fitting is in the shape of a first hollow cylinder and a second hollow cylinder, with the external diameter of said first hollow cylinder being identical to the external diameter of said sintered metal tube, and the external diameter of said second hollow cylinder being essentially identical to the internal diameter of said sintered metal tube such that said second hollow cylinder is positioned within said sintered metal tube.

2. The membrane tube as claimed in claim 1, wherein said fitting consists of metal.

3. The membrane tube as claimed in claim 1, wherein said membrane tube has a ceramic layer which consists of zirconium oxide partially stabilized with yttrium or pure zirconium oxide or titanium oxide or aluminum oxide, wherein said ceramic layer acts as diffusion barrier and is arranged between said sintered metal tube and said membrane.

4. The membrane tube as claimed in claim 1, wherein the connecting area between said fitting and said sintered metal tube is arranged symmetrically relative to the axis of the membrane tube and a portion of the connecting area has the shape of a circular ring or a cone surface, with the surface of the cone opening in the direction of said fitting.

5. A process for producing a membrane tube for the permeative separation of hydrogen from hydrogen-containing gas mixtures, said process comprising:
   a: joining a fitting consisting of a gastight material to an open end of a gas-permeable sintered metal tube, wherein said fitting is in the shape of a first hollow cylinder and a second hollow cylinder, the external diameter of said first hollow cylinder being identical to the external diameter of said sintered metal tube, and the external diameter of said second hollow cylinder being essentially identical to the internal diameter of said sintered metal tube such that said second hollow cylinder is positioned within said sintered metal tube;
   b: applying a membrane containing palladium to said sintered metal tube to completely cover said sintered metal tube, whereby said membrane projects beyond said sintered metal tube at said open end to which said fitting is joined.

6. The process as claimed in claim 5, wherein said fitting is joined to said sintered metal tube by sintering or soldering or friction welding.

7. The process as claimed in claim 2, wherein said sintered metal tube is rolled or hammered directly into or onto said fitting before joining.

8. The process as claimed in claim 5, wherein said sintered metal tube is brought to defined dimensions by rolling or hammering before joining.

9. The process as claimed in claim 5, wherein at least the outside of said sintered metal tube is coated with a diffusion barrier before said membrane is applied in such a way that it completely covers said diffusion barrier.

10. The process as claimed in claim 5, wherein said membrane is joined in a gastight manner to said fitting.

11. A reactor for producing hydrogen, said reactor comprising at least one membrane tube according to claim 1, wherein said at least one membrane tube is fixed at one end via a fitting in the reactor and is joined to said reactor in a gastight manner.

12. The membrane tube according to claim 1, wherein said membrane consists of palladium.

13. The membrane tube as claimed in claim 1, wherein said fitting consists of ceramic.

14. The membrane tube as claimed in claim 1, wherein said fitting consists of a composite comprising metal and ceramic.

15. The membrane tube as claimed in claim 1, wherein said membrane is made of palladium or a palladium-containing alloy.

16. The membrane tube as claimed in claim 1, wherein said fitting is joined to the sintered metal tube by sintering, soldering or friction welding.

17. The membrane tube as claimed in claim 1, wherein said fitting and said sintered metal tube are made of the same material.

18. The membrane tube as claimed in claim 1, wherein the connecting area between said fitting and said sintered metal tube is roughened or provided with flutes or grooves.

19. The membrane tube as claimed in claim 3, wherein said membrane extends beyond said ceramic layer and is joined in a gastight manner to said fitting.

20. The reactor as claimed in claim 11, wherein said fitting is joined to a perforated plate or another tube in said reactor by means of welding, soldering, adhesive bonding or screwing.

* * * * *